INVENTOR.
JAMES L. BAIRD
BY Richard P. Crowley
ATTORNEY

United States Patent Office 3,449,216
Patented June 10, 1969

3,449,216
MULTISTAGE EVAPORATOR SYSTEM FOR THE SEPARATION OF MONOMER-SOLVENT MIXTURES
James L. Baird, Winchester, Mass., assignor to Artisan Industries Inc., Waltham, Mass., a corporation of Massachusetts
Filed Aug. 11, 1966, Ser. No. 571,919
Int. Cl. B01d 3/10, 1/26
U.S. Cl. 202—173                               10 Claims

ABSTRACT OF THE DISCLOSURE

A multistage evaporator system wherein a feed stream comprising a relatively high boiling point compound and a relatively low boiling point compound is introduced into a single pass primary evaporator. The feed stream is discharged into the first zone of a separator. The vaporous portion is recovered and the liquid portion is introduced into a single pass secondary evaporator. The liquid vapor stream from the secondary evaporator is discharged into the second zone of the separator which is disposed below the first zone and separated therefrom, in part, by fractionating trays. The vapor in the second zone passes through the fractionating trays into the first zone and the liquid in the second zone is introduced into a vapor-liquid stripper.

My invention concerns an improved multi-stage evaporator system and method for the separation or recovery of a monomer or other heat-sensitive component from a solvent-monomer mixture.

In the recovery of small amounts, for example, less than about 5 percent by weight of a relatively high-boiling point monomer from a relatively low boiling point solvent such as in a monomer-solvent mixture, considerable care must be taken to prevent polymerization of the monomer during the processing. The heat-sensitive monomer should be separated quickly without undue heat or high temperature exposure on processing, so that the amount of polymerization obtained during the recovery operation is at a minimum. Conventional recovery systems typically comprise one or more stages, each stage of which includes an evaporator in combination with an evaporator stripper. These systems in addition require a series of separate condensers and vacuum systems, which substantially increase the capital and operating cost. In addition, evaporators which operates above a 70 to 80 percent evaporation in one pass often produces unstable operation of the evaporator, so that the evaporator stripper size, i.e., throat diameter or sections, must be substantially increased to insure adequate operation. Further, such multi-stage evaporation systems as used in the past, due to multiple pass operation, tend to promote more polymerization of the monomer product than is desired. There exists, therefore, a need for a simple, low-cost, versatile evaporator system which avoids the difficulty of multi-stage evaporation systems as employed in the past.

It is, therefore, an object of my invention to provide a multi-stage evaporator system for separating or recovering a relatively high boiling point component such as a monomer from a relatively low boiling point component such as a solvent such as from a monomer-solvent mixture, which system accomplishes a higher degree of evaporation at lower capital costs than if the same process were to be carried out in two distinct stages by conventional means.

Another object of my invention is to provide a system and means for recovering a relatively high-boiling point monomer from a monomer-solvent system or other heat-sensitive product with a reduced amount of thermal degradation or polymerization of the product.

A further object of my invention is to provide a single, multi-stage evaporation system for removing small amounts of one component from a mixture containing that component, which system is characterized by low capital cost and high evaporative efficiency over conventional systems and includes the use of a single condenser and vacuum system.

Other objects and advantages of my invention will be apparent to those persons skilled in the art from the following more detailed description of my system when taken in conjunction with the attached drawing wherein.

Figure 1:
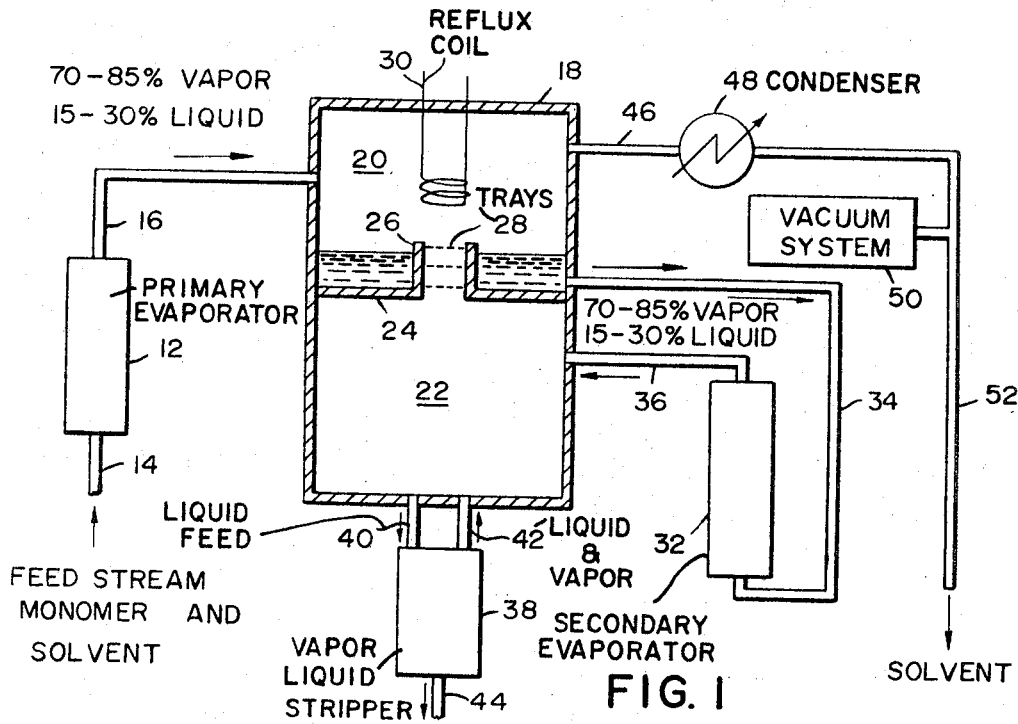
FIG. 1 is a schematic diagram of one embodiment of a multi-stage evaporation system of my invention which comprises a pirmary evaporator, a secondary evaporator, a thin film stripping unit, and a vapor-liquid separator with fractionating means.

I have found that an unexpectedly efficient, low-cost recovery apparatus or system which accomplishes one or more objects of my invention is provided by the combination of a single pass primary evaporator, a single pass secondary evaporator, an evaporator stripping unit such as of the falling film or mechanically aided type, and a vapor body or chamber serviced by a single condensing and pressure system. My apparatus permits a higher degree or evaporation to be accomplished with a smaller stripper than is normally required, and in a more efficient and low-cost manner. Where desired fractionation of the vapor from both the primary, secondary evaporators, and/or stripper, or all units may be readily added by the insertion of fractionation means such as trays or a refluxing column within the vapor portion of the vapor-liquid separator. My system may be operated under isobaric conditions, e.g., by the use of a single vacuum pump, and vapor recovered by the use of a single condenser system operating with the vapor-liquid separator or vapor body. My evaporator system is flexible to the needs of the processor, since it permtis a number of different possible combinations adaptable to the processing conditions and materials without significant design or additions to the system. For example, my system may operate without fractionation means in the vapor-liquid separator, or have fractionation or reflux means included in the vapor body. In addition, the stripper unit to recover the high boiling point component or monomer may include a falling film type evaporator stripper such as described in U.S. Patent 3,198,241 used as a stripping unit or a mechanically aided rotary wiped, thin film type, cylindrical or tapered evaporator employed such as in U.S. Patent 2,927,634. Of course, the particular system to be used depends upon the material to be recovered and the optimum operating conditions desired.

In operation a dilute feed mixture comprising, for example, a monomer-solvent mixture with the monomer in a small amount, 0.05 to 5.0 percent, is fed to the primary evaporator where evaporation of up to about 90 percent, typically from 70 to 85 percent of the feed material is accomplished in a single pass with the entire vapor-liquid mixture removed overhead an directed to and separated in the top of a divided vapor body or vapor-liquid separator. The liquid from this first stage operation is then directed to a secondary single pass evaporator operated at a higher temperature where again up to 90 percent, typically from 70 to 85 percent of the liquid is evaporated with substantially the entire vapor-liquid mixture being directed to and separated in the lower half of a divided vapor body. This liquid from the separator is then directed to a stripping unit wherein the high boiling point monomer is recovered from the stripping unit, and the vapor from the stripping unit directed to the vapor-liquid separator and joined with the vapor from the primary evaporator, and, hence, to a condensing system for recovery of the relatively low boiling point solvent. Usually, in operation my entire evaporator system will be conducted under appropriate vacuum conditions; however, under some conditions the system can be operated under atmospheric or higher pressure. Where desired, fractionation of some or all of the vapors in the vapor-liquid separator may be provided by the insertion of fractionation means such as a reflux coil and/or fractionization trays within the vapor-liquid separator. My system may be employed in typical recovery operations such as the recovery of small quantities of isocyanate such as polymethylene phenyl diisocyanate from a solvent solution, recovery of monomer or polymers from furfural, recovery of lactams or caprolactam from water, the recovery of ketones or diketenes from solvents, the recovery of hydrocarbons from solvents, one or more reactants from esterification reactions, and the like. For example, in the conventional system, say for the recovery of 0.1 percent by weight of polymethylene phenyl diisocyanate from a hydrocarbon like toluene solvent, about 9 percent polymerization typically may occur, while with my system and method undesired polymerization may be reduced to as low as 1 percent. In addition, my system enables a single falling film evaporator stripper of a throat of 4 inches with 20 sections to be employed, rather than the same stripper having a throat of 14 inches and about 25 sections.

For illustrative purposes only my system will be described in connection with the recovery or separation of nylon wash water into two components, namely lactam as the monomer and water as the solvent. As shown in the attached drawing my system comprises in combination a primary single pass evaporator 12 having a feed conduit 14 at the one end for the introduction of a feed stream comprising a high boiling point monomer and a solvent, and a discharge conduit 16 at the top for the withdrawal of substantially all the feed stream or both liquid and vapor normally comprising 70 to 85 percent vapor and 15 to 30 percent liquid. A vapor body or a liquid-vapor separator 18 is provided having an upper chamber 20 and lower chamber 22 divided by an imperforate membrane or diaphragm 24, and containing in the central portion thereof a short, tubular riser 26 extending upwardly by a predetermined distance in the upper chamber 20, which riser 26 includes therein a series of fractionating trays 28. The riser 26 should be higher than the liquid level in the chamber 20. Located in the upper chamber 20 and directly above the fractionating tray 28 is a reflux coil 30 through which cold water or other heat exchange medium is circulated. The vapor body 18 functions to separate the vapor and liquid from the primary and secondary evaporators. The upper chamber 20 is for the separation of the vapor-liquid from the primary evaporator and the lower portion for the separation of the vapor-liquid from the secondary evaporator 32. The fractionating trays and reflux coil are the fractionating means to fractionate vapors passing from the lower chamber 22 to upper chamber 20.

A single pass secondary evaporator 32 is provided with an inlet conduit 34 to the bottom of the evaporator 32 from the upper chamber 20 of the vapor body 18 for the introduction of the liquid from the primary evaporator 12 to the secondary evaporator 32, and a discharge conduit 36 from the top of the evaporator 32 into the lower chamber 22 of the vapor body 18 wherein substantially all of the liquid feed is introduced into chamber 22 as 70 to 85 percent vapor and 15 to 30 percent liquid. A vapor-liquid stripping unit 38, such as a falling film evaporator stripper or rotary mechanically aided thin film evaporator is provided with a liquid feed conduit 40 introducing the liquid from the lower chamber 22 of the vapor body 18 to the top or the inlet of the stripping unit 38 with conduit 42 directing vapors from the stripper 38 into the lower chamber 22 of the vapor body. The liquid monomer is recovered from the discharge end or bottom of the stripper through conduit 44. A vapor discharge conduit 46 from the upper portion 20 of the vapor body 18 is connected to a single condenser 48, while the condensate solvent is discharged through conduit 52. The entire evaporator system is maintained under substantially isobaric conditions by a vacuum system 50 such as a vacuum pump on the condensate side of the condenser 48.

In operation for the recovery of the monomer caprolactam from the caprolactam-water mixture, the feed mixture is introduced through conduit 14 into evaporator 12 and a vapor-liquid mixture removed through conduit 16 and introduced into the upper portion 20 of vapor body 18. The vapor from the primary evaporator is removed through vapor body 20 and conduit 46 to condenser 48 and recovered, as a liquid condensate, from conduit 52. The liquid collecting in the lower chamber of vapor body 20 is withdrawn through conduit 34 and introduced for the second stage evaporation into the secondary evaporator 32. The vapor-liquid is withdrawn from the secondary evaporator 32 through conduit 36 and introduced into the lower portion 22 of the vapor body 18. The liquid collecting in the lower portion of the vapor body 22 is introduced through conduit 40 into an evaporator stripper 38 which permits the liquid monomer or lactam to be removed and recovered through discharge conduit 44. The vapor from the secondary evaporator is reintroduced through conduit 42 into the lower chamber 22 of the vapor body 18. In operation the vapor body 18 in the system is maintained under a pressure of about 100 torr by vacuum pump 50. A small fractionating column shown as 26 with fractionating trays 28 and a reflux coil 30 are employed in this particular system to return part of the lactam and/or polymerized lactam, i.e., oligomers, which may be generated in the stripping unit 38 to the stripper to prevent the monomer or polymer from going overhead with the water through the vapor discharge conduit 46.

Typical operating conditions for the recovery of a nylon wash water in the system described are more fully set forth in Table I:

*Table I*

(1) Feed to primary evaporator—2000 pounds per hr. (p.p.h.):

Monomer—4 weight percent lactam (80 p.p.h.)
Solvent—96 weight percent water (1920 p.p.h.)

(2) Vapor-liquid offtake from primary evaporator (126° F.) to vapor body:

|  | Vapor, p.p.h. | Liquid, p.p.h. |
|---|---|---|
| Lactam | 0.47 | 79.53 |
| Water | 1495.53 | 424.47 |

(3) Vapor-liquid offtake from secondary evaporator (135° F.) to vapor body:

|  | Vapor, p.p.h. | Liquid, p.p.h. |
|---|---|---|
| Lactam | 0.46 | 80.47 |
| Water | 344 | 79.07 |

(4) Recovery of liquid monomer from stripper:

Lactam—99 weight percent (78.47 p.p.h.)
Water—1 weight percent (0.79 p.p.h.)

(5) Recovery of solvent from condenser:

Lactam—0.08 weight percent (1.53 p.p.h.)
Water—99.92 weight percent (1919.21 p.p.h.)

Figure 2:
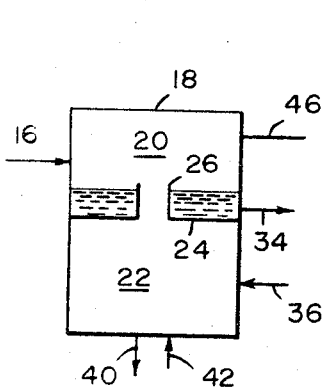
FIGS. 2 through 5 illustrate schematic diagrams of variations in the vapor-liquid separator of the FIG. 1 system.

FIGS. 2–5 are illustrations of various modifications and embodiments within the vapor body 18 of my evaporation system, which provides design simplicity and versatility to the system. FIG. 2 shows a vapor body 18 wherein the central riser 26 does not contain gas-liquid contact packing material or fractionating trays within the riser, but rather the riser is left free for the passage of vapors from the lower chamber 22 into the upper chamber 20, and, hence, through conduit 46 to the condenser 48. In addition, the vapor body, as illustrated in FIG. 2, may be further modified by the addition of the reflux coil above the riser 26 to aid in returning small amounts of the relatively high boiling point component back to the lower chamber 22.

Figure 3:
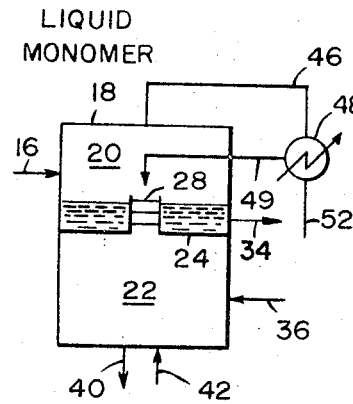

FIG. 3 illustrates a vapor body 18 similar to that in FIG. 1, but with the omission of the reflux coil and with a reflux conduit 49 extending from the condenser to return a portion of the liquid condensate to the upper chamber 20 and to the fractionating trays 28.

Figure 4:
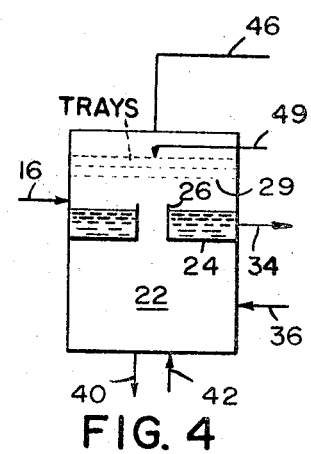

FIG. 4 illustrates a vapor body 18 which contains a series of fractonating trays 29 which rather than being within the central riser 26, as illustrated in FIG. 1, extend across the entire width of the upper chamber 20 with a reflux conduit 49 from the condenser 48 serving to introduce liquid condensate back through the fractionating trays 29. In this manner all of the vapor from the primary evaporator 12, the secondary evaporator 32, and the stripper 38 is subject to fractionation prior to condensation.

Figure 5:
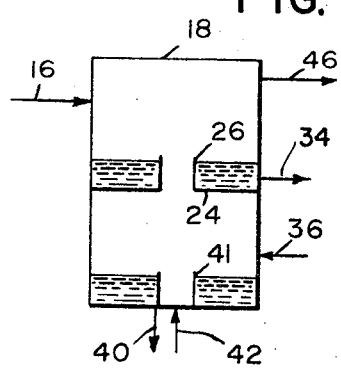

FIG. 5 shows another embodiment wherein the vapor body 18 includes a central tubular riser 41 extending a short distance upward from the bottom portion of the vapor chamber 22 with the liquid from the secondary evaporator 32 introduced by conduit 36 permitted to accumulate in the lower portion of chamber 22 where it is introduced into a mechanically aided, thin film evaporator via conduit 40, while vapor is returned into the riser 41 via conduit 42. As thus illustrated, the vapor body or vapor-liquid separator may be modified by various means while retaining the basic components of my evaporation system.

My invention has been particularly illustrated with separate primary and secondary evaporators; however, it is recognized as within the scope of my invention and claims that the primary and secondary evaporators may be combined within a single shell with separate channels. Further, my system may be used with more than two evaporators, for example, with three, four or more evaporators in series.

As described my system is an efficient, low-cost method of recovering monomers from monomer-solvent mixtures while minimizing the thermal degradation or polymerization of the monomer to be recovered. In addition, my system as described is versatile in that the same basic components may be readily adapted to a variety of recovery and separation problems.

What I claim is:

1. An apparatus for the separation of a small amount of a relatively high boiling point compound from a mixture containing a relatively low boiling point compound, which system comprises in combination:
    (a) a single pass primary evaporator;
    (b) a single pass secondary evaporator;
    (c) a condenser;
    (d) an evaporator-stripper;
    (e) a liquid-vapor separator including an upper and lower vapor chamber and means within the separator to permit the passage of vapors from the lower to the upper chamber;
    (f) means to maintain the system under substantially isobaric conditions;
    (g) means to introduce the feed mixture to be separated into the primary evaporator;
    (h) means to withdraw the feed mixture as a vapor-liquid mixture from the primary evaporator and to introduce the vapor-liquid mixture into the upper vapor chamber;
    (i) means to withdraw liquid from the upper chamber and introduce it into the secondary evaporator;
    (j) means to withdraw the liquid introduced into the secondary evaporator as vapor-liquid mixture and to introduce it into the lower vapor chamber;
    (k) means to introduce liquid from the lower vapor chamber into the evaporator-stripper;
    (l) means to recover the relatively high boiling point compound as a liquid concentrate from the evaporator-stripper;
    (m) means to return vapor from the evaporator-stripper to the vapor-liquid separator;
    (n) means to introduce vapor from the vapor-liquid separator to the condenser; and
    (o) means to recover the relatively low boiling point compound as a liquid concentrate from the condenser whereby the feed mixture is separated with a high degree of efficiency, low cost and a minimum of thermal degradation.

2. The apparatus of claim 1 wherein the vapor-liquid separator includes means to fractionate vapor introduced into the separator.

3. The apparatus of claim 1 wherein the means within the separator to permit the passage of vapors from the lower to the upper chamber include means to fractionate the vapors passing from the lower to the upper chamber.

4. The apparatus of claim 2 wherein the upper chamber includes a riser extending upwardly a predetermined distance into the upper chamber between the upper and lower chambers, which riser contains a series of fractionating means, and a reflux means.

5. The apparatus of claim 2 which includes reflux means to recycle liquid condensate from the condenser to the fractionation means.

6. The apparatus of claim 1 wherein both the upper and lower vapor chambers include an upper and lower central riser extending upwardly from the bottom of each chamber a predetermined distance and the evaporator-stripper is a mechanically aided, thin film evaporator with the means to introduce the liquid from the lower vapor chamber to the mechanically aided evaporator, and the means to return the vapor from the mechanically aided evaporator to the lower vapor chamber.

7. A method of separating a relatively high boiling point compound from a mixture containing a relatively low boiling point compound, which method comprises:
    (a) introducing a feed stream comprising a mixture of the compounds to be separated into a single pass primary evaporator;
    (b) withdrawing from the primary evaporator in a single stream the feed mixture comprising about 70 to 90 percent vapor and about 30 to 10 percent liquid;
    (c) subsequently separating the vapor from the liquid in the upper part of a separating zone;
    (d) introducing the separated liquid into a single pass secondary evaporator;
    (e) withdrawing from the secondary evaporator another mixture comprising about 70 to 90 percent vapor and about 30 to 10 percent liquid;
    (f) separating the liquid from the vapor in said other mixture in the lower part of said separating zone, which liquid is now high in the relatively high boiling point compound;
    (g) introducing the last mentioned separated liquid from the secondary evaporator into a stripping unit, and recovering from the stripping unit the relatively higher boiling point compound as a liquid concentrate;
    (h) condensing the vapors rich in the relatively low boiling point compound from the primary evaporator, secondary evaporator and the stripping unit; and
    (i) recovering the relatively low boiling point compound as a liquid concentrate while carrying out the method under substantially isobaric pressure conditions.

8. The method of claim 7 which includes fractionating the vapor from the lower part of the evaporating zone and returning heavier fractions to the lower portion of the separation zone and lighter fractions to the upper portion of said separation zone.

9. The method of claim 8 which includes condensing the lighter fractions then returning that portion of the condensed lighter fractions as a reflux stream in the fractionation of the vapors.

10. The method of claim 7 wherein the feed mixture comprises a small amount of a relatively high boiling point, organic monomer subject to polymerization during processing and a relatively low boiling point solvent for the monomer.

References Cited

UNITED STATES PATENTS

| | | | |
|---|---|---|---|
| 351,795 | 11/1886 | Rice | 159—28 |
| 391,458 | 10/1888 | Dixon | 159—27 |
| 2,184,579 | 12/1939 | Brucke | 202—234 |
| 3,179,642 | 4/1965 | Pflegerl et al. | 260—88.2 |
| 3,324,009 | 6/1967 | Griffith et al. | 202—173 |

FOREIGN PATENTS

| | | |
|---|---|---|
| 74,691 | | France. 2nd addition to 1,178,135. |
| 546,416 | 7/1942 | Great Britain. |

NORMAN YUDKOFF, *Primary Examiner.*

J. SOFER, *Assistant Examiner.*

U.S. Cl. X.R.

202—202; 203—78